United States Patent [19]

DiGiulio

[11] Patent Number: 4,622,346

[45] Date of Patent: Nov. 11, 1986

[54] PROCESS FOR PRODUCING MODIFIED STYRENIC POLYMER BEADS FOR HIGH STRENGTH FOAMED ARTICLES

[75] Inventor: Adolph V. DiGiulio, Wayne, Pa.

[73] Assignee: Atlantic Richfield Company, Los Angeles, Calif.

[21] Appl. No.: 802,901

[22] Filed: Nov. 29, 1985

[51] Int. Cl.$^4$ ............................................. C08J 9/18
[52] U.S. Cl. ........................................ 521/59; 521/56; 521/57; 521/60; 521/139; 525/242; 526/346; 428/35
[58] Field of Search .................. 521/56, 59, 60, 57, 521/139; 525/242; 526/346; 428/35, 407; 427/222

[56] References Cited

U.S. PATENT DOCUMENTS

| | | | |
|---|---|---|---|
| 3,259,594 | 7/1966 | Wright | 521/147 |
| 3,259,595 | 7/1966 | Wright | 521/147 |
| 3,324,052 | 6/1967 | Zwern et al. | 521/59 |
| 3,960,784 | 6/1976 | Rubens | 521/59 |
| 4,579,872 | 4/1986 | Johnson | 521/59 |

*Primary Examiner*—Morton Foelak
*Attorney, Agent, or Firm*—Lewis J. Young

[57] ABSTRACT

Styrenic polymer beads that are useful in forming foamed cups with improved strength and thermal properties are prepared by forming an aqueous suspension of initial styrenic polymer beads and adding thereto an emulsion of a comonomer solution of styrenic monomer and divinylbenzene, which emulsion also contains free-radical-producing catalysts, and the suspension with added monomers is heated to copolymerize the styrenic monomer and divinylbenzene within and on the initial beads and form modified beads.

3 Claims, No Drawings

PROCESS FOR PRODUCING MODIFIED STYRENIC POLYMER BEADS FOR HIGH STRENGTH FOAMED ARTICLES

BACKGROUND OF THE INVENTION

The present invention is directed to a process for forming styrenic polymer beads that form foams having high strength and thermal properties. Such high strength foams are useful, for example, in the production of cups for drinking.

The formation of styrenic polymer beads by an aqueous suspension process is a well known and commercial practice. Such production is generally effected by the suspension polymerization of a styrenic monomer in an aqueous medium with an oil-soluble polymerization catalyst, using a suspending system comprising of a finely divided, difficulty water-soluble inorganic phosphate, such as tricalcium phosphate, in conjunction with an anionic surface-active agent, such as sodium dodecylbenzene sulfonate, as a modifier. Such suspension polymerization systems are described, for example, in Grim Patent, U.S. Pat. No. 2,673,194, the contents of said patent being incorporated by reference herein. Such styrenic polymer beads are made expandable by impregnation with a suitable blowing agent.

The foamed cup industry is based on expandable polystyrene (EPS) beads. The base polystyrenic polymer beads used for cups are prepared by an aqueous suspension polymerization in order that the polystyrenic polymer may be recovered as beads which can be screened to a relatively precise bead size. Because of the thin walls in cups, relatively small bead sizes are required in a strict range, such as through 35 on 70 mesh (U.S. Standard Sieve). The conventional polystyrene used for EPS beads for cups are characterized by a weight average molecular weight (Mw) of about 250,000–350,000 with a polydispersity ($M_w/M_n$) of about 2–3. Such polystyrenes generally have melt flows (M.I., Condition L) in the 2.0–6.0 g/10 min. range. The intrinsic properties of such polystyrenes puts a limit on the molding conditions for producing cups as well as on the cup properties such as strength. Past efforts to utilize higher molecular weight polystyrenes (350,000–500,000) with M.I. of 1–2, with similar $M_w/M_n$ in order to improve on heat sensitivity and cup strength has generally resulted in poor overall performance in regard to cup processing capabilities as well as cup appearance.

BRIEF SUMMARY OF THE INVENTION

We have now found that improved stiffness, heat tolerance and resistance to leakage for a given density of cup relative to current commercial polystyrene cups can be realized by preparing EPS-type beads which have been modified with a styrenic monomer-divinylbenzene (SM/DVB) copolymer, wherein said SM/DVB copolymer is more or less uniformly dispersed throughout the initial styrenic polymer bead or is concentrated near or at the surface of the bead. The concentration gradient of SM/DVB copolymer in the styrenic bead is controlled by the process conditions. Depending on the formulary and the polymerization conditions, the SM/DVB copolymer present may be high molecular weight and toluene soluble, or toluene insoluble gels, or a combination of both.

The improvements in heat tolerance, stiffness and resistance to leakage appear to be related to a variety of modified bead morphologies. When the SM/DVB copolymer is concentrated primarily at or near the bead surface, the improvements may result from a molecular weight and density differential in the expanded bead, with the molecular weight and hence density of the surface being greater than the core.

Alternatively, the improvements result, when the SM/DVB copolymer is more or less uniformly dispersed, to form (a) varying degrees of semi-interpenetrating networks of crosslinked SM/DVB copolymer with the initial styrenic polymer or with the initial styrenic polymer and soluble, lightly crosslinked SM/DVB copolymer or (b) lightly crosslinked essentially soluble SM/DVB copolymer which increases the overall molecular weight and polydispersity of the final bead.

DETAILED DESCRIPTION OF THE INVENTION

The present process provides a means for forming SM/DVB modified styrenic polymers which can be converted to foams with improved strength, thermal properties and resistance to leakage by copolymerizing a SM/DVB solution absorbed near or at the surface or more or less uniformly dispersed throughout pre-screened styrenic polymer beads.

The process comprises (a) forming an aqueous suspension of pre-screened, initial styrenic polymer beads with the aid of a suitable suspending agent system; (b) forming a comonomer solution of a styrenic monomer and divinylbenzene; (c) forming an emulsion comprising a suitable emulsifier and said comonomer solution with free-radical-producing catalysts dissolved therein; (d) adding the emulsion to the styrenic polymer bead suspension at 25°–75° C. and allowing said beads to absorb the comonomers and catalysts either near or at the surface of said beads or allow the beads to absorb and equilibrate so that the comonomers and catalyst solution is more or less uniformly distributed throughout the beads; (e) heating the suspension of styrenic beads containing the absorbed comonomers and catalysts to an intermediate polymerization temperature to give firm beads; and (f) heating said bead suspension to a temperature of 115° C. to about 135° C. to substantially complete the polymerization of said styrenic monomer and divinylbenzene.

Step (d) of the process may be varied without detracting from the improvements obtained in the final product. For example, a portion of the emulsified comonomer solution without dissolved catalyst may be added and allowed to be absorbed into the initial styrenic beads, followed by the addition of the remaining comonomer emulsion containing all of the dissolved catalyst. Conversely, a portion of the emulsified comonomer containing dissolved catalyst may be added initially to the bead suspension, followed by the addition of the remaining emulsified comonomers.

The term "styrenic" as used herein is intended to include styrene, alpha-methylstyrene, nuclear-methylstyrene, para-t-butylstyrene, monochlorostyrene and dichlorostyrene, as well as mixtures thereof, or such styrenic polymer beads containing at least 50 percent of a styrenic moiety and other ethylenically unsaturated monomers, when used in conjunction with the styrenic polymer beads or styrenic monomer.

The formation of styrenic polmer initial beads is according to known processes and the present invention is directed to a process for forming styrenic polymer beads by coating on or dispersing throughout such initial beads a copolymer of styrenic monomer and divinylbenzene. The initial polymer beads must have a weight average molecular weight of between 230,000 and 350,000 with a polydispersity (Mw/Mn) of 2–3.1.

The initial styrenic polymer beads are formed into a suspension in an aqueous medium by dispersing the beads in water, containing suitable suspending agent system. One such system may be a finely divided, difficultly water-soluble, inorganic phosphate suspending agent such as those described in Grim U.S. Pat. No. 2,673,194, and include tricalcium phosphate, hydroxyapatite, magnesium phosphate, and the like. Modifiers, such as sodium dodecylbenzene sulfonate can also be added as per the Grim patent. The amount of such suspension agent added is about 2.5–4.0 percent by weight of the final product, with about 3 percent by weight preferred. Another such system is a polyvinyl alcohol suspending agent, such as is sold under the trademark "Vinol 540", in an amount of 0.07–0.30 percent by weight, with a preferred amount of about 0.10 percent, based on the final product weight. Other organic suspending agent systems include hydroxyethyl cellulose and polyvinyl pyrrolidone. Equally useful systems employ combinations of inorganic and organic suspending agents, for example tricalcium phosphate and polyvinyl alcohol. Mixture of these systems can also be used. The initial styrenic polymer beads may also have additional additives, such as internal fast-cool agents, pigments and dyes, stabilizers, anti-lump agents, self-extinguishing agents, plasticizers, and polymeric additives, such as minor amounts (0.05–0.50 wt. %) of polyethylene, polypropylene, and in particular, polywaxes such as low molecular weight (Mn 650–1500), narrow MWD, crystalline (densities 0.93–0.96) polyethylenes and similar molecular weight Fisher-Tropsch waxes.

There is also prepared a solution of styrenic monomer and divinylbenzene. The divinylbenzene comonomer may be any of the three isomers thereof, or preferably, may be any of the commercially available mixtures thereof.

The amount of styrenic monomer and divinylbenzene present in the solution will depend upon the amount of the copolymer to be dispersed in and on about the initial styrenic beads but should be such that the final beads produced comprise 65 to 92 percent by weight of the initial styrenic polymer beads and 8 to 35 percent by weight of the copolymer. The copolymer itself should be formed from a mixture of styrenic monomer and divinylbenzene such that the copolymer is formed from 99.15 to 99.98 by weight styrenic monomer and 0.02 to 0.85 percent by weight of divinylbenzene. This solution containing dissolved catalysts is then converted to an emulsion with the addition thereto of a suitable emulsifier. Suitable emulsifiers may be the sodium alkylbenzene sulfonates, such as dodecylbenzene sulfonate, as well as the various nonionic surfactants comprising polyoxyethylene mono-ethers and mono-esters, such as polyoxyethylene sorbitan monolaurate, wherein the polyoxyethylene portion may have from 20 to 50 moles of ethylene oxide. Examples of the mono-ethers are the ethylene oxide condensates of octyl or nonylphenol. The catalysts are a mixture of at least two free-radical type materials comprising a primary low-temperature initiator having a 10-hour half-life temperature of between 60° and 80° C. and a secondary high-temperature initiator having a 10-hour half-life temperature of between 95° and 110° C. Thus, a mixture of benzoyl peroxide and t-butyl perbenzoate which have 10-hour half-life temperature of 73° and 105° C., respectively, can be used. Azo catalysts having suitable 10-hour half-life temperatures are also useful.

The aqueous comonomer catalyst emulsion, so produced, is added continuously to the aqueous suspension of styrenic polymer beads over a period of about 0.30–2.5 hour, while heating the suspension with stirring, at a temperature of between 25° and 75° C. and maintaining that temperature during the addition. The suspension of styrenic beads containing absorbed comonomer/catalyst may then be either heated to an intermediate temperature of about 80°–95° C. over a period of 10–45 minutes directly after the addition of comonomer/catalyst emulsion is complete or it may be allowed to stand at 25°–75° C. for various time periods to permit the absorbed comonomer/catalyst to diffuse more or less uniformly throughout the beads before heating to the intermediate temperature of about 80°–95° C. Then the suspension is heated further at the intermediate temperature of about 80°–95° C. until the beads are firm or for a period of 0.10–6.0 hours. The morphology of the resulting SM/DVB modified beads can be varied during this comonomer addition stage and polymerization to firm beads and will be dependent on a number of factors such as the rate of comonomer addition, temperature at the time of addition, and the time interval before the temperature is increased to produce a significant copolymerization rate. The morphology therefore may be varied wherein the SM/DVB copolymer (either toluene soluble or insoluble or mixture thereof) may be more or less concentrated toward the surface, as a consequence of fairly rapid addition and rapid attainment of significant copolymerization rate to obtain firm beads, or the SM/DVB copolymer may be more or less uniformly dispersed throughout the bead, as a consequence of the length of time allowed for absorption and equilibration of the comonomers in the initial styrenic bead to occur before permitting significant copolymerization to form firm beads.

After heating at the intermediate temperature of about 80°–95° C. has been completed, the suspension is then further heated, such as for four hours at 115° C. or one to three hours at 135° C., to reduce the amount of unpolymerized monomers to less than 0.25%, preferably less than 0.05%.

Alternatively, the comonomer solution can be divided into two portions, with the catalysts added to one portion only. For example, the portion with no catalyst may consist of approximately ⅔ of the total solution and, after emulsification, is added at any desired temperature between 25° and 75° C. to the suspended polystyrenic polymer beads. The remaining ⅓ of the solution containing all of the catalysts is emulsified, and added to the suspension at the same temperature or a different temperature. A further alternative could be the addition of the catalysts-containing portion first, followed by the addition of the portion not containing catalysts.

Again, the rate of addition may be rapid or slow, and the absorption equilibration times may be varied in order to control the morphology in the final bead product. The comonomers absorbed on or in the styrenic beads are then polymerized at the intermediate temperature of about 80°–95° C. and finished off at 135° C. as before.

The amount of toluene insoluble gels and degree of crosslinking in the gels will be primarily a function of the amount of comonomer to be added, the DVB concentration and polymerization conditions. Relatively high DVB levels will generally cause essentially all of the comonomers to be converted to gels along with some gel formed via grafting with the seed styrenic polymer. It is recognized by those skilled in the art however that gelation primarily of the added styrene-DVB comonomers can be delayed by reducing the amount of DVB or the degree of polymerization of the added monomers by using chain transfer agents or increased polymerization rates. The extent of crosslinking is also controlled by these variables. Thus extensive crosslinking with the formation of "tight" networks in the gel can be obtained by using relatively high levels of DVB and avoiding the use of chain transfer agents. Decreasing the DVB concentration of course will reduce the extent of crosslinking and eventually the amount of gels formed with a given DVB comonomer modifying solution. The modifying DVB copolymer can comprise from 8–35% by weight of the final bead product and may be essentially toluene soluble, high molecular weight (Mw>350,000) or may be in the form of toluene insoluble gels or a mixture of toluene insoluble gels and toluene soluble DVB copolymer.

Consequently, for a given percentage of DVB copolymer desired in the final beads (ranging from 8–35 percent by weight), the DVB/catalysts concentration and polymerization conditions can be varied to produce either high, intermediate or very little or no levels of gels. However, the DVB concentration lends itself to producing major changes readily. For example, in the absence of chain transfer agents and relatively moderate polymerization conditions, the use of about 0.35 percent DVB or higher based on styrenic monomer will convert essentially all of the SM/DVB comonomer to gels with the higher DVB levels causing the gel network to become "tighter". Reducing the DVB levels will cause a decrease in gels and a gradual increase in the molecular weight and polydispersity of the toluene soluble components until at very low levels of about 0.02% DVB (based on styrene monomer) little or no gels are formed.

The best overall balance of cup properties, such as molding cycle, rim strength improvement, heat tolerance, appearance and resistance to leakage is obtained when the percentage by weight of gels in the overall final bead is in the range of approximately 8–27%. When the gel level is at the high end of the range, then the gel network should be relatively "loose" in order that expandability and molding characteristics are not impaired. When little or no gel (<2.0%) is formed, then the molecular weight of the final bead should be high, >350,000, and the polydispersity broad, >2.8.

In general, the higher the weight percent of SM/DVB copolymer modifier in the final bead, the lower the DVB concentration needed to obtain final beads with the desired range of characteristics which result in cups with improved strength, heat tolerance and resistance to leakage.

Beads useful for cups because of the thin walls are of necessity much smaller than those generally found useful for other EPS applications such as packaging, insulation boards and the like, which generally require lower densities and thicker parts. As a consequence, the desirable bead size for cups will fall in the mesh range of through 30 on 80, with generally only a relatively low percentage being on 35 mesh. Consequently, since the process is a bead growth process, pre-screened beads are generally utilized with the average seed bead size being selected on the basis of the amount of DVB copolymer modifications desired in the final product. The greater the percentage modification with DVB copolymer the smaller the required seed bead needed to produce a final bead product in the desired average bead size useful for cups. This poses no serious problem, since such seed beads are available via current commercial processes.

The modified beads as formed may be separated from the aqueous suspension, washed, dried, and screened, if necessary. The copolymerization process is carried out so that essentially no secondary bead formation (from the SM/DVB comonomer solution) occurs. Consequently, by the judicious selection of pre-screened beads, and the amount of the comonomers added, the bead growth can be controlled to give a final bead size suitable for a given application, such as cups. The modified beads may be impregnated directly in the same reactor without further bead screening. This has significant economic advantage.

The beads are made expandable by the usual impregnation techniques using blowing agents which are gases or produce gases on heating, such as aliphatic hydrocarbons containing from 4 to 6 carbon atoms in the molecule, such as butane, pentane, cyclopentane, hexane, cyclohexane and the halogenated hydrocarbons which boil at a temperature below the softening point of the polymer. Mixtures of these agents may also be used. The blowing agents are incorporated by conventional processes, such as that described in U.S. Pat. No. 2,983,692.

The present invention is further illustrated in the following examples, wherein parts and percentages are by weight unless otherwise indicated.

EXAMPLE I

A. Formation of 21.4% Copolymer in and on Polystyrene Beads

A series of examples was carried out as follows. An initial polystyrene bead slurry was prepared in a 2-liter resin kettle having an agitator, reflux condenser, combination baffle/thermometer wells and a monomer feed port, by adding thereto 600 g water, 16.0 g polyvinyl alcohol solution (5% active), 12 g tricalcium phosphate and 440 g polystyrene beads of through 35 mesh and on 50 mesh bead size (U.S. Standard Sieve). The weight average molecular weight (Mw) of the polystyrene was 270,000. The slurry was heated, with stirring at 300 rpm, to 70° C. A comonomer solution (I) was formed by mixing 120 g styrene, and 0.821 g divinylbenzene, (80.6% active), and 0.074 g of Perox Violet dye. An emulsion (II) of (I) was prepared from 80 g (I), 120 g water, and 0.8 g of polyoxyethylene (20) sorbitan monolaurate and mixed for 5 minutes using a Polytron high intensity stirrer. The emulsion (II) was added dropwise over a period of about 7 minutes to the suspension at 70° C. An emulsion (III) of a solution of catalyst was then added. This emulsion (III) was formed by dissolving 0.207 g benzoyl peroxide and 0.063 g of t-butyl perbenzoate in 40.8 g comonomer solution (I) with mild stirring. The resultant solution then had added thereto 50 g water containing 0.5 g polyoxyethylene (20) sorbitan monolaurate. This mixture was intensely mixed with the Polytron homogenizer for several minutes to form the emulsion (III). The emulsion (III) was added continuously to the slurry over 33 minutes at 70° C. Then the mixture was heated to 90° C. over approximately 15 minutes and maintained at 90° C. for 4 hours. A sample of beads removed after 15 minutes at 90° C. were firm, uniform in color, with no evidence of secondary bead formation.

The suspension was cooled to 35° C. and transferred in approximately 200 g. portions to 12-ounce bottles containing 1 g. tricalcium phosphate and 1 ml of 1% sodium dodecylbenzene sulfonate. The bottles were purged with nitrogen, sealed with crown caps and rotated end-over-end in an oil bath heated to 135° C. over 1.5 hours and at 135° C. for 1.5 hours. After cooling to room temperature, the bottles were opened and the contents acidified to pH 1.0 with hydrochloric acid. The beads were separated and water-washed on a 100 mesh sieve. The beads were spherical, non-agglomerated, uniform in color, and were within the proper size range, i.e., >99.5% passing through a 35-mesh sieve and retained on a 50-mesh sieve, desired for molding of foam cups from expandable beads.

B. Impregnation of Modified Beads

To render the beads, from the series of examples, expandable, aliquots thereof were impregnated by n-pentane in 12 oz. bottles heated at 105° C. for two hours while being rotated end-over-end in an oil bath according to the following formulations:

100 g of beads of polystyrene having 21.4% total weight of styrene/divinylbenzene copolymer from above.
100 g water
2.0 g tricalcium phosphate
0.02 g sodium dodecylbenzene sulfonate
0.15 g polyoxyethylene(20)sorbitan monolaurate
7.8 g n-pentane The bottles were cooled to room temperature, opened, acidified with hydrochloric acid, centrifuged, water-rinsed, tray-dried until free-flowing. Volatile content of the impregnated beads was 6.14% with only 0.04% of water. The beads were then treated with 300 ppm of silicone oil and 1000 ppm of zinc stearate in a twin shell blender for 30 minutes and then batch expanded in a 5 gallon Buccaneer pre-expander to the pre-expanded beads of density 4.24 pcf.

C. Formation of 12 and 30% Copolymer in and on Polystyrene Beads

In a manner similar to A above, polystyrene beads containing approximately 12% and 30% styrene-divinylbenzene copolymer based on final bead weight were prepared, impregnated and expanded. At all three copolymer modification levels (12, 21.4, and 30%) the tert-butyl perbenzoate concentration (based on styrene monomer) was kept approximately constant at 0.053%, but the benzoyl peroxide and active divinylbenzene concentrations were varied in order to assess their effect on cup properties. The seed beads used in the 30% S/DVB modification passed through 45 mesh and retained on 80 mesh. After modification, 99.7% passed through 40 mesh.

D. Cup Molding and Evaluation

All of the above-laboratory prepared materials were molded on a cup machine made by Master Machine and Tool Company using an 8F mold to produce 8 oz. smooth wall cups at a steam header pressure of 52 psi and a back pressure of 32 psi. The total cycle consists of four stages: (1) fill time—filling the mold, (2) dwell time—time steam heats the mold wall by conduction, (3) cook time—time steam actually passes through expanded pre-puff in the mold, and (4) cool time—time it takes for cooling water to cool the mold for cup ejection.

The results of this example are tabulated in Table I. The polystyrene controls were molded at a cook time of about 1.5 seconds, but the beads modified with styrene-divinylbenzene copolymer were given a cook time of 5.0 seconds. The controls could not withstand the longer cook times.

TABLE I

| No. | % Copolymer | % BPO/% DVB | Prepuff Density (Pcf) | Cup Weight (g.) | Rim Deflection (mils) | % Improvement over Polystyrene Controls | |
|---|---|---|---|---|---|---|---|
| | | | | | | Cup Wt. | Deflection |
| 1 | 12.0 | 0.173/0.275 | 3.46 | 2.09 | 398 | 2.3 | 3.4 |
| 2 | 12.0 | 0.173/0.54 | 3.87 | 2.35 | 325 | 4.1 | 5.5 |
| 3 | 12.0 | 0.177/0.825 | 3.51 | 2.08 | 363 | 8.3 | 13.2 |
| 4 | 12.0 | 0.20/0.825 | 3.80 | 2.23 | 335 | 6.3 | 10.2 |
| 5 | 12.0 | 0.155/0.275 | 3.24 | 1.94 | 410 | 8.1 | 10.9 |
| 6 | 21.4 | 0.173/0.276 | 3.71 | 2.27 | 300 | 11.0 | 17.8 |
| 7 | 21.4 | 0.173/0.55 | 4.19 | 2.55 | 235 | 12.7 | 21.7 |
| 8 | 21.4 | 0.173/0.55 | 4.24 | 2.63 | 225 | 11.1 | 20.5 |
| 9 | 21.4 | 0.20/0.55 | 4.42 | 2.75 | 210 | 11.0 | 19.8 |
| 10 | 21.4 | 0.173/0.55 | 3.98 | 2.37 | 259 | 14.4 | 23.4 |
| 11 | 21.4 | 0.20/0.55 | 3.72 | 2.24 | 284 | 14.8 | 23.5 |
| 12 | 21.4 | 0.173/0.55 | 3.90 | 2.35 | 255 | 15.8 | 25.7 |
| 13 | 30.0 | 0.20/0.55 | 4.88 | 3.07 | 168 | 13.2 | 20.4 |
| 14 | 30.0 | 0.177/0.55 | 4.88 | 3.08 | 169 | 12.7 | 19.1 |
| 15 | 30.0 | 0.155/0.275 | 3.46 | 2.28 | 334 | 7.2 | 4.2 |
| 16 | 30.0 | 0.20/0.275 | 3.39 | 2.21 | 340 | 6.8 | 10.5 |
| 17 | 30.0 | 0.155/0.825 | 5.28 | 3.56 | 158 | 4.0 | 5.9 |
| 18 | 30.0 | 0.20/0.825 | 4.54 | 3.00 | 200 | 5.4 | 9.9 |
| 19 | 30.0 | 0.155/0.825 | 4.53 | 2.92 | 224 | 2.0 | 1.3 |
| 20 | 30.0 | 0.20/0.825 | 4.21 | 2.74 | 234 | 6.4 | 10.8 |

As can be seen from Table I, in all cases where polystyrene beads were modified with S/DVB copolymer, the cups had improved cup weight and deflection compared to the cups molded from the polystyrene controls. The rim deflection of the cups in mils was measured on a Chatillion LTCM Tension and Compression Tester, using a deflection speed of 0.35 inch/minute at a force of 200 grams.

EXAMPLE II

To illustrate that, since bead size control is so good with the copolymer modification techniques there is no need to screen the beads prior to impregnation, a series of runs was made using a single reactor in which both the modification and impregnation steps were carried out. Two methods of modification were carried out as follows:

Procedure A: One step addition of emulsified comonomer-Initiator solution.

To a 25 gallon stirred reactor was added 69.6 parts of distilled water, 78.7 parts of polystyrene beads (Mw 280,000; bead size through 35 and on 50 mesh, U.S. Standard Sieve), 6.0 parts of tricalcium phosphate and 0.0031 parts of sodium dodecylbenzenesulfonate. The reactor was maintained at 25° C., while a homogenized solution of comonomers and initiators was added over 30 minutes. The emulsified (homogenized) solution contained 21.25 parts of styrene, 0.106 parts (80.6% active) (0.40% based on styrene) divinylbenzene, 30.42 parts water, 0.0429 parts (0.20% based on styrene) of benzoyl peroxide, 0.0112 parts (0.053% based on styrene) of tert-butyl perbenzoate and 0.0192 parts of sodium dodecyl benzenesulfonate. The agitated bead slurry was heated to 90° C. over 30 minutes, held at 90° C. for 2.5 hours and then heated to and at 135° C. over 3.0 hours. The beads then contained 21.4% by weight of styrene divinylbenzene copolymer.

This procedure was similar to Procedure A except that the modification solution was added in 2 steps. Approximately ⅔ of the styrene-divinylbenzene solution was homogenized without any initiators present, with 21.48 parts of water containing 0.0136 parts of the emulsifier, sodium dodecylbenzene sulfonate, and added to the slurry at 70° C. over 10 minutes. The remaining ⅓ of the comonomer solution, containing the initiators was homogenized with 8.94 parts of water containing 0.0057 parts emulsifier, and then added over 45 minutes at 70° C., and the resulting bead slurry heated to 90° C. and held at 90° C. for 1.5 or 4.0 hours before finishing off at 135° C. The beads were impregnated with pentane as in Procedure A.

In both Procedures, A and B, the emulsified monomers can be added either at 25° C., or at 70° C., as described, or any temperature in between. Similarly, the times of polymerization at 90° C. could be varied. It was found that after the addition of the emulsified comonomer solution, samples of beads removed after 15 minutes at 90° C. were quite firm and uniform in size distribution. Reduction of the polymerization time at 90° C. to as low as 1.5 hours was accomplished without any apparent adverse effects on expandability or the cup properties produced.

TABLE II

| Run No. | % BPO/% DVB | Procedure A Temp./Time (°C./min) | Hours 90° C. | Prepuff Density (PCF) | Cup Weight (g.) | Rim Deflection (mils) | % Improvement over PS Controls Cup Wt. | Deflection |
|---|---|---|---|---|---|---|---|---|
| 1 | 0.173/0.40 | 70/45 | 4.0 | 3.45 | 2.02 | 330 | 16.2 | 24.5 |
|   |   |   |   | 3.86 | 2.25 | 287 | 14.1 | 22.6 |
|   |   |   |   | 5.18 | 3.06 | 174 | 10.8 | 18.3 |
| 2 | 0.20/0.40 | 70/45 | 4.0 | 3.0 | 1.79 | 395 | 17.1 | 23.3 |
|   |   |   |   | 3.84 | 2.26 | 295 | 12.4 | 19.6 |
|   |   |   |   | 5.08 | 3.00 | 201 | 5.1 | 9.0 |
| 3 | 0.20/0.40 | 70/45 | 4.0 | 3.30 | 1.94 | 368 | 15.3 | 22.3 |
|   |   |   |   | 4.05 | 2.36 | 268 | 13.2 | 21.2 |
|   |   |   |   | 5.25 | 3.19 | 178 | 6.2 | 10.1 |
| 4 | 0.20/0.40 | 70/135 | 4.0 | 3.40 | 2.00 | 359 | 12.7 | 18.6 |
|   |   |   |   | 4.17 | 2.41 | 278 | 9.4 | 15.5 |
|   |   |   |   | 4.82 | 2.81 | 223 | 6.0 | 11.2 |
| 5 | 0.20/0.40 | 70/135 | 4.0 | 3.23 | 1.91 | 359 | 12.2 | 23.2 |
|   |   |   |   | 3.80 | 2.22 | 301 | 12.6 | 20.2 |
|   |   |   |   | 4.97 | 2.93 | 197 | 8.4 | 14.7 |
| 6 | 0.20/0.40 | 70/135 | 4.0 | 3.35 | 2.00 | 367 | 11.5 | 17.0 |
|   |   |   |   | 3.78 | 2.21 | 310 | 12.0 | 18.6 |
|   |   |   |   | 5.25 | 3.21 | 185 | 3.6 | 6.1 |
| 7 | 0.20/0.40 | 25/30 | 2.5 | 3.33 | 1.98 | 360 | 13.2 | 18.9 |
|   |   |   |   | 3.87 | 2.25 | 282 | 14.4 | 23.4 |
|   |   |   |   | 5.06 | 2.96 | 173 | 14.2 | 24.1 |
| 8* | 0.20/0.30 | 25/30 | 1.5 | 3.57 | 2.06 | 308 | 15.2 | 25.2 |
| 9* | 0.173/0.40 | 70/30 | 1.5 | 4.14 | 2.48 | 237 | 9.5 | 20.5 |

*3 sec. cook

The modified bead slurry was cooled from 135° C. to 105° C., then 0.15 parts of polyoxyethylene(20)sorbitan monolaurate in 3.26 parts of water was bombed into the reactor, followed by the addition of 7.8 parts of n-pentane over 1.5 hours. The slurry was held at 105° C. for an additional 0.5 hours, then cooled to 35° C.; acidified to pH 1 and the beads were filtered, washed and dried.

Procedure B: Two step addition of emulsified comonomer and emulsified comonomer/catalyst solution.

Samples modified according to Procedure A were molded into 8 oz. cups as in Example I using 52 psi steam header pressure and 32 psi back pressure with a cook time of 5 seconds except as indicated in the results in Table II.

Samples modified according to Procedure B were molded into 8 oz. cups as above using 80 psi steam header pressure and from 34 to 45 psi back pressure with a cook time of 3 seconds, with results shown in Table III.

TABLE III

| Run No. | % BPO/% DVB | Procedure B Temp./Time (°C./min) | Temp./Time (°C./min) | 90° C. Hold (hours) | Prepuff Density (Pcf) | Cup Weight (g.) | Rim Deflection (mils) | % Improvement over PS Controls Cup Wt. | Deflection |
|---|---|---|---|---|---|---|---|---|---|
| 10 | 0.173/0.40 | 70°/10 | 70°/45 | 4.0 | 3.76 | 2.13 | 280 | 16.5 | 28.2 |
|   |   |   |   |   | 4.65 | 2.62 | 205 | 9.0 | 22.1 |

TABLE III-continued

| Run No. | % BPO/% DVB | Procedure B Temp./Time (°C./min) | Temp./Time (°C./min) | 90° C. Hold (hours) | Prepuff Density (Pcf) | Cup Weight (g.) | Rim Deflection (mils) | % Improvement over PS Controls Cup Wt. | Deflection |
|---|---|---|---|---|---|---|---|---|---|
|    |             |         |         |     | 3.34 | 1.91 | 318 | 20.1 | 31.9 |
|    |             |         |         |     | 3.34 | 1.91 | 315 | 20.8 | 32.6 |
| 11 | 0.16/0.40   | 70°/10  | 70°/45  | 4.0 | 3.48 | 2.03 | 320 | 15.1 | 24.5 |
|    |             |         |         |     | 3.70 | 2.16 | 281 | 15.0 | 26.4 |
|    |             |         |         |     | 5.12 | 3.06 | 160 | 1.6  | 6.4  |
| 12 | 0.173/0.40  | 25°/10  | 25°/45  | 1.5 | 4.02 | 2.33 | 232 | 15.3 | 30.5 |
| 13 | 0.20/0.30   | 25°/10  | 25°/45  | 1.5 | 3.71 | 2.13 | 290 | 15.1 | 25.6 |
| 14 | 0.173/0.40  | 70°/10  | 70°/45  | 1.5 | 3.97 | 2.38 | 241 | 12.5 | 25.2 |
| 15 | 0.20/0.30   | 70°/10  | 70°/45  | 1.5 | 3.83 | 2.31 | 257 | 12.8 | 24.4 |
| 16 | 0.35/0.40   | 70°/10  | 70°/45  | 1.5 | 3.10 | 1.81 | 415 | 12.1 | 17.8 |
| 17 | 0.35/0.50   | 70°/10  | 70°/45  | 1.5 | 3.13 | 1.83 | 397 | 13.3 | 20.0 |
| 18* | 0.35/0.40  | 70°/10  | 70°/45  | 1.5 | 3.17 | 1.86 | 444 | 6.1  | 8.4  |
| 19 | 0.35/0.30   | 70°/10  | 70°/45  | 1.5 | 3.18 | 1.83 | 416 | 11.2 | 16.1 |

*14.1 coating

EXAMPLE III

A. Formation of Polystyrene Beads Modified with 21.4% Styrene-Divinylbenzene Copolymer To illustrate the effect of divinylbenzene concentration and the benzoyl peroxide/divinylbenzene ratio on the amount of gel formation and the molecular weight of the soluble polymer, the series of runs summarized in Table IV were made.

Runs 7, 9, and 12 were 25-gallon reactor runs. Runs 7 and 12 were made according to Example II, procedure B; Run 9 according to Example II, procedure A. In Runs 9 and 12, however, the suspensions were allowed to equilibrate at 70° C. for one hour prior to heat up to the intermediate temperature. The remaining runs were conducted in the 2-liter kettle of Example I.

The BPO/DVB levels were varied as indicated in Table IV, whereas the secondary initiator, t-BP, was kept in the range of 0.053-0.066% based on styrene monomer. In all cases, the emulsified comonomer additions were made at 70° C. but with several variations in the mode, time of additions, and hold times at 70° prior to heat up to the intermediate polymerization temperatures of about 80°-95° C.

Run 1 was conducted according to Example IA except no polyvinyl alcohol was utilized in conjunction with the tricalcium phosphate suspending agent and sodium dodecylbenzene sulfonate was used as the emulsifying agent in place of the polyoxyethylene (20) sorbitan monolaurate.

The reactions conducted in the 2-liter kettle from Example I for Runs 2-6, 8, 10 and 11 were as follows:

Prescreened polystyrene beads, 440 g., of through 35 and on 60 mesh, U.S. Standard Sieve, with weight average molecular weight, $M_w$, of about 270,000 and $M_w/M_n$ of about 2.35, were charged to the reactor along with 400 g. distilled water and 12 g. tricalcium phosphate and heated to 70° C. while stirring at 400 rpm. The comonomer/catalyst solution consisting of 120 g. styrene with dissolved divinylbenzene (80.6% active), BPO and t-BP as shown in Table IV was mixed with 160 g. distilled water containing 0.12 g. of dissolved sodium dodecylbenzene sulfonate, and emulsified by intensive mixing for about 1-2 minutes with the Polytron homogenizer.

In runs 1, 7 and 12, two thirds of the emulsified comonomer solution without catalyst was added at 70° C. to the polystyrene bead suspension over 20, 10 and 10 minutes, respectively, while maintaining stirring, followed by the remaining one third containing all of the catalysts added over 30, 45 and 45 minutes, respectively. In the remaining runs, all of the emulsified comonomer/catalysts was added at 70° C. while stirring at 400 RPM's over approximately 30 minutes. Runs 1, 2, and 7 were then heated to the intermediate temperature of 90° C. directly after the additions were completed, whereas in all the remaining runs, the suspensions were allowed to soak for one additional hour at 70° C. prior to heat up to the intermediate temperatures. After heat up to the intermediate temperature, generally within 5-15 minutes, and hold time at such temperature as indicated in the Table, the suspensions were then heated to and at 135° C. for approximately three hours to complete the copolymerizations. The beads were recovered as in Example IA, except Runs 7, 9, and 12 were impregnated directly in the reactor.

B. Impregnation of Modified Beads

The beads from Runs 1-6, 8, 10, and 11, were impregnated with n-pentane as in Example IB; the beads in Runs 7, 9, and 12, as already indicated, were impregnated as in Example IIA.

C. Cup Molding and Evaluation

Runs 1-4 and 7 were molded on the Master Cup Machine using an 8 oz. mold as described in Example ID.

Runs 5, 6, and 8-12 were molded on a Thompson Cup Machine using a 6 oz. smooth wall mold at a header pressure of 120 psi and back pressure of 45 psi.

The results of the cup evaluations are tabulated in Table V. The polystyrene controls were molded with cook times of about 0.9-1.4 seconds. Extra cook times of 1.0 additional second resulted in burned cups. The results in Table V for the S/DVB modified products were obtained on cups molded with the 1.0 second extra cook time, showing their much greater heat tolerance and improved cup strength.

At cup densities of between 3.0 and 4.3 pcf all runs showed improvements in rim deflection of between 17 and 29%, which translates into cup weight improvements of between 10 and 17% over the polystyrene controls.

D. Characterization of Bead Products

The various bead products were separated into toluene soluble and toluene insoluble components and the soluble component was further characterized as to weight average molecular weight, Mw, and polydispersity, $M_w/M_n$.

Samples of beads, approximately 0.4-1.0 g., were accurately weighed, placed in stoppered flasks along with 200 g. of toluene. These were allowed to digest, with intermittent swirling, for periods of 3-7 days. The gels were filtered into crucibles onto Celite filter beds and percent gels quantitatively determined. The soluble component was recovered from the toluene filtrate by precipitation into methanol. The $M_w$ and $M_w/M_n$ were determined on a Waters Gel Permeation Chromatograph, Model 150C.

Visually, it was noted that the high DVB (0.55 and 0.40% DVB) beads swelled less and were generally more easily filtered and retained their bead identity longer after filtering. The intermediate DVB beads (0.20–0.30%) swelled more and when filtered lost their bead identity more quickly, and had a greater tendency to clog the filter. The samples with 0.10 and 0.04% DVB were essentially soluble in the toluene. Results of these runs were shown in Table IV.

TABLE IV

| Run No. | % BPO/% DVB[d] | Coating °C./min | Procedure °C./min | Hold Temp °C./hrs. | Toluene Insoluble gels % | Soluble $M_w \times 10^{-3}$ | $M_w/M_n$ |
|---|---|---|---|---|---|---|---|
| Control | 0.25/— | — | — | 90°/6 | — | 270 | 2.4 |
| 1 | 0.30/0.55 | 70°/20 | 70°/30 | 90°/4 | 24.4 | 262 | 2.32 |
| 2 | 0.175/0.40 | — | 70°/30 | 90°/1.5 | 25.4 | 264 | 2.49 |
| 3 | 0.30/0.40 | — | 70°/30[c] | 80°/0.5 | 22.6 | 246 | 2.35 |
| 4 | 0.30/0.40 | — | 70°/30[c] | 90°/0.25 | 24.1 | 259 | 2.35 |
| 5 | 0.35/0.40 | — | 70°/30[c] | 90°/1.5 | 23 | 258 | 2.34 |
| 6 | 0.35/0.30 | — | 70°/30[c] | 90°/1.5 | 20.3 | 258 | 2.54 |
| 7[a] | 0.25/0.25 | 70°/10 | 70°/45 | 90°/1.5 | 20.3 | 270 | 2.42 |
| 8 | 0.40/0.20 | — | 70°/30[c] | 90°/1.5 | 14.3 | 281 | 2.65 |
| 9[a] | 0.40/0.20 | — | 70°/30[c] | 90°/1.5 | 13.0 | 295 | 2.62 |
| 10 | 0.30/0.10 | — | 70°/30[c] | 90°/1.5 | 3.3 | 334 | 3.0 |
| 11[b] | 0.20/0.04 | — | 70°/30[c] | 90°/1.5 | 1.5 | 368 | 2.8 |
| 12 | 0.25/0.25 | 70°/10 | 70°/45[c] | 90°/1.5 | | | |

[a]prepared in a 25 gal reactor
[b]25% S/DVB comonomers
[c]allowed to soak 1.0 hr at 70° C. after comonomer addition completed
[d]active percent based on styrene.

TABLE V

| Run No. | Pre-Puff Density (pcf) | Cup Weight (g) | Rim Deflection (mils) | % Improvement Over PS Controls Cup Wt. | Deflection |
|---|---|---|---|---|---|
| 1 | 3.87 | 2.35 | 269 | 13 | 22 |
| 2 | 4.27 | 2.59 | 240 | 10 | 17 |
| 3 | 3.54 | 2.11 | 335 | 10 | 15 |
| 4 | 3.54 | 2.08 | 307 | 14 | 24 |
| 5 | 3.46 | 1.87 | 178 | 12 | 23 |
| 6 | 3.35 | 1.81 | 176 | 15 | 29 |
| 7 | 3.28 | 1.99 | 316 | 17 | 28 |
| 8 | 3.35 | 1.86 | 179 | 16 | 29 |
| 9 | 3.15 | 1.78 | 203 | 11 | 20 |
| 10 | 3.16 | 1.74 | 212 | 11 | 21 |
| 11 | 3.21 | 1.80 | 189 | 13 | 24 |
| 12 | 3.10 | 1.71 | 209 | 13 | 25 |

From Table IV, it can be seen that at the higher DVB levels (0.40–0.55%) the S/DVB comonomers all go into the formation of gels and some additional gels are formed by some grafting with the initial polystyrene. The molecular weight and polydispersities of the toluene soluble polystyrene component is very similar to that of the control polymer. At moderate DVB levels (0.25–0.30%), almost all of the comonomers are converted to gels. At 0.20% DVB, the gels decrease significantly and the molecular weight and polydispersity of the soluble component increased moderately. At the lower DVB levels, (0.04–0.10), the gels were quite low, but the $M_w$ and $M_w/M_n$ increased significantly.

What is claimed is:

1. The process for forming styrene polymer beads having a styrene monomer-divinylbenzene copolymer relatively uniformly dispersed throughout the bead for use in producing foamed cups with improved strength and thermal properties comprising:
   (a) forming an aqueous suspension of initial polystyrene beads having a weight average molecular weight of 230,000 to 350,000 with a polydispersity (Mw/Mn) of 2 to 3.1, with the aid of a suitable suspending agent system;
   (b) forming a comonomer solution of styrene monomer and divinylbenzene;
   (c) forming an emulsion comprising suitable emulsifier and a portion of said comonomer solution;
   (d) adding the emulsion to the styrene polymer bead suspension at 25°–75° C. to allow the comonomers to be absorbed into the beads;
   (e) forming a second emulsion comprising a suitable emulsifier, the remaining portion of said comonomer solution, and free-radical-producing catalysts;
   (f) adding the second emulsion to the suspension of said beads absorbed with comonomers at 25°–75° C., at a rate such that the rate of absorption of comonomer/catalyst by said beads is at least equivalent to the rate of addition of emulsified comonomer/catalyst solution, then allowing said suspension to stand for 30 minutes to 4 hours, and then raising the temperature to 80°–95° C., and maintaining the suspension at said temperature to polymerize said comonomers; and
   (g) heating said suspension at a temperature of 115° C. to about 135° C. to substantially complete the polymerization of said styrene monomer and divinylbenzene to form beads having copolymer relatively uniformly distributed throughout the beads;
   (h) cooling the suspension to 105° C. or less;
   (i) adding a non-ionic surfactant and 3–12% by weight based on polymer of a blowing agent selected from the group consisting of aliphatic hydrocarbons containing 4 to 6 carbon atoms, halogenated hydrocarbons which boil at a temperature below the softening point of the polymer, and mixtures of these;
   (j) heating the suspension at a temperature of from 80°–150° C. to impregnate the polymer beads with blowing agent; and
   (k) cooling the suspension to room temperature, acidifying the suspension, and separating the impregnated beads from the aqueous system.

2. The process of claim 1 wherein said suitable suspending agent system is tricalcium phosphate suspending agent in combination with sodium dodecylbenzene sulfonate surfactant and polyoxyethylene(20)sorbitan monolaurate non-ionic surfactant.

3. Expandable styrene polymer beads for use in producing foamed cups with improved strength and thermal properties comprising (a) styrene polymer beads having 8–35% by weight of a copolymer of 99.15–99.98% by weight of styrene monomer and 0.02–0.85% by weight of divinylbenzene relatively uniformly distributed throughout said beads, wherein said styrene polymer beads are prepared by the process of claim 1, and (b) 3–12% of a blowing agent selected from the group consisting of aliphatic hydrocarbons containing 4–6 carbon atoms, halogenated hydrocarbons which boil at a temperature below the softening point of the polymer, and mixtures of these.

* * * * *